(12) United States Patent
Lin

(10) Patent No.: US 7,222,384 B1
(45) Date of Patent: May 29, 2007

(54) AUTOMOBILE SIDE WINDOW WIPER

(76) Inventor: Chiang-Fen Lin, P.O. Box 90, Tainan City (TW) 70499

( * ) Notice: Subject to any disclaimer, the term of this patent is extended or adjusted under 35 U.S.C. 154(b) by 0 days.

(21) Appl. No.: 11/389,203

(22) Filed: Mar. 27, 2006

(51) Int. Cl.
B60S 1/56 (2006.01)
B60S 1/26 (2006.01)
B60S 1/18 (2006.01)

(52) U.S. Cl. .................. 15/250.003; 15/250.3
(58) Field of Classification Search ......... 15/250.1, 15/250.001, 250.003, 250.3, 250.43
See application file for complete search history.

(56) References Cited

U.S. PATENT DOCUMENTS 2,690,350 A * 9/1954 Shapiro ............. 296/153
6,185,805 B1 * 2/2001 Rosiere et al. ......... 29/428

FOREIGN PATENT DOCUMENTS

JP 59-149848 * 8/1984
JP 64-52559 * 2/1989
JP 1-175546 * 7/1989

* cited by examiner

Primary Examiner—Gary K. Graham

(57) ABSTRACT

An automobile side window wiper includes a connect base, a motor, a worm, a worm gear, a connect rod, a driving arm, a plate stop, a side cover and a wiper. The motor is positioned in the connected base, having its spindle fixed with the worm, which engages with the worm gear. Then the connect rod has a first end pivotally and eccentrically connected with the worm gear to be moved back and forth by the worm gear, so the driving arm connected pivotally with the connect rod to swing up and down so that the wiper connected with a second end of the driving arm may move repeatedly up and down nearly horizontally on the glass of the side window for wiping rain drops. Then the side window is kept clean for a driver to see through to look at a rearview mirror for driving safely during rainfall.

1 Claim, 5 Drawing Sheets

AUTOMOBILE SIDE WINDOW WIPER

BACKGROUND OF THE INVENTION

1. Field of the Invention

This invention relates to an automobile side window wiper, particularly to one used for wiping water drops on a side window during rainfall so as to keep the glass of a side window clean to be looked through for a driver to look at a rearview mirror clearly.

2. Description of the Prior Art

Common automobiles are provided with rearview mirrors at the right and the left side of a driver's seat for a driver to check the traffic condition behind his own automobile for turning directions, surpassing another automobile, changing a lane or stopping. But during rainfall, the side windows may be drenched with raindrops so a driver cannot see through the side windows to check the rearview mirrors, affecting safety in driving.

SUMMARY OF THE INVENTION

This invention has been devised to offer an automobile side window wiper for wiping rain drops off a right or a left side window.

The feature of the invention is a motor arranged in a connect base fixed with a side window of an automobile, a worm rotated by the motor, a worm gear engaging with the worm for moving a connect rod eccentrically combined with the worm gear and connected with a driving warm then connected with a wiper. When the motor is operated to rotate the worm and the worm gear, the driving arm, by back-and-forth movement of the connect rod, can push the wiper to move up and down nearly horizontally on the glass of the side window to remove rain drops remained thereon during rain fall.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
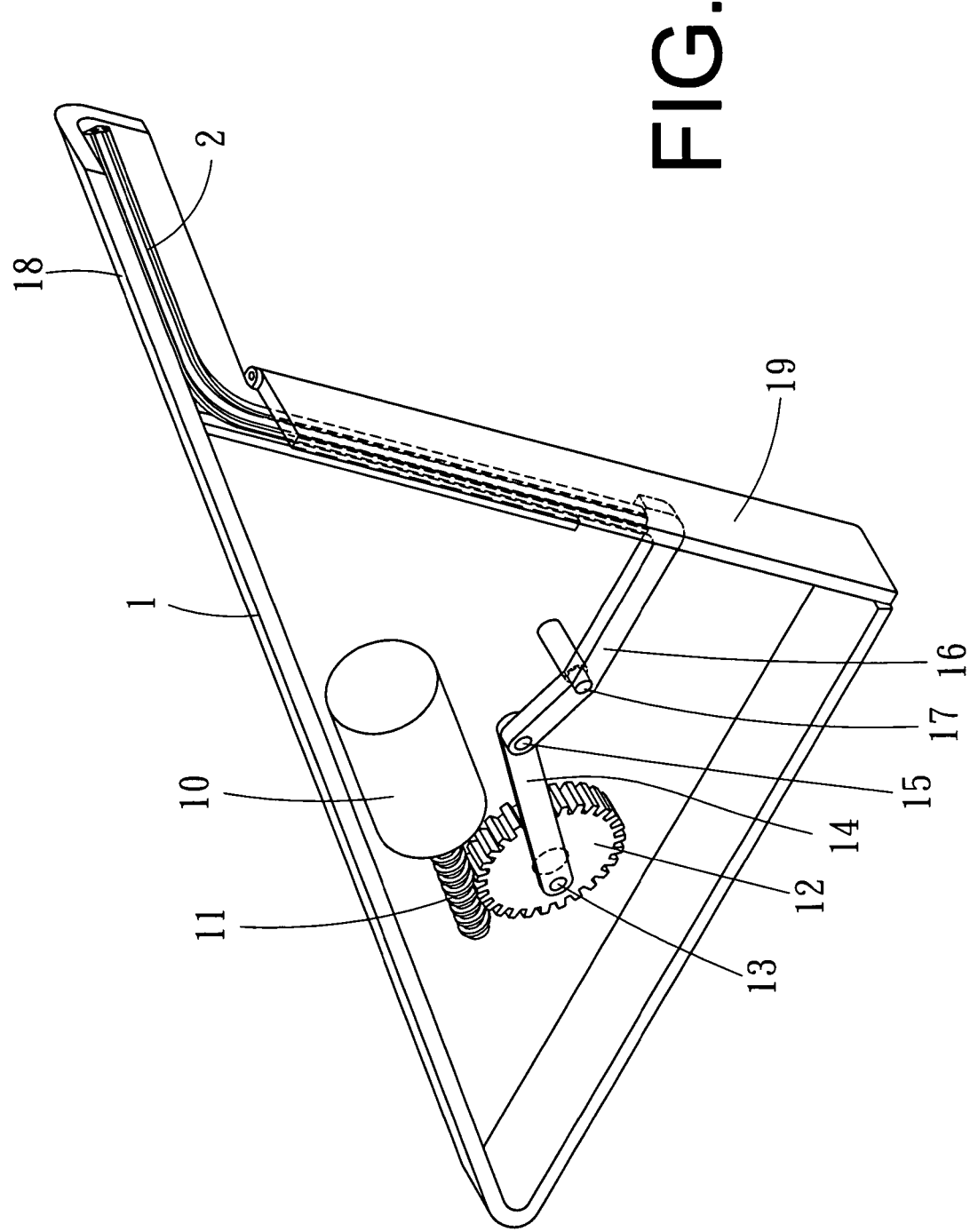
FIG. 1 is a perspective view of an automobile side window wiper in the present invention.
Figure 2:
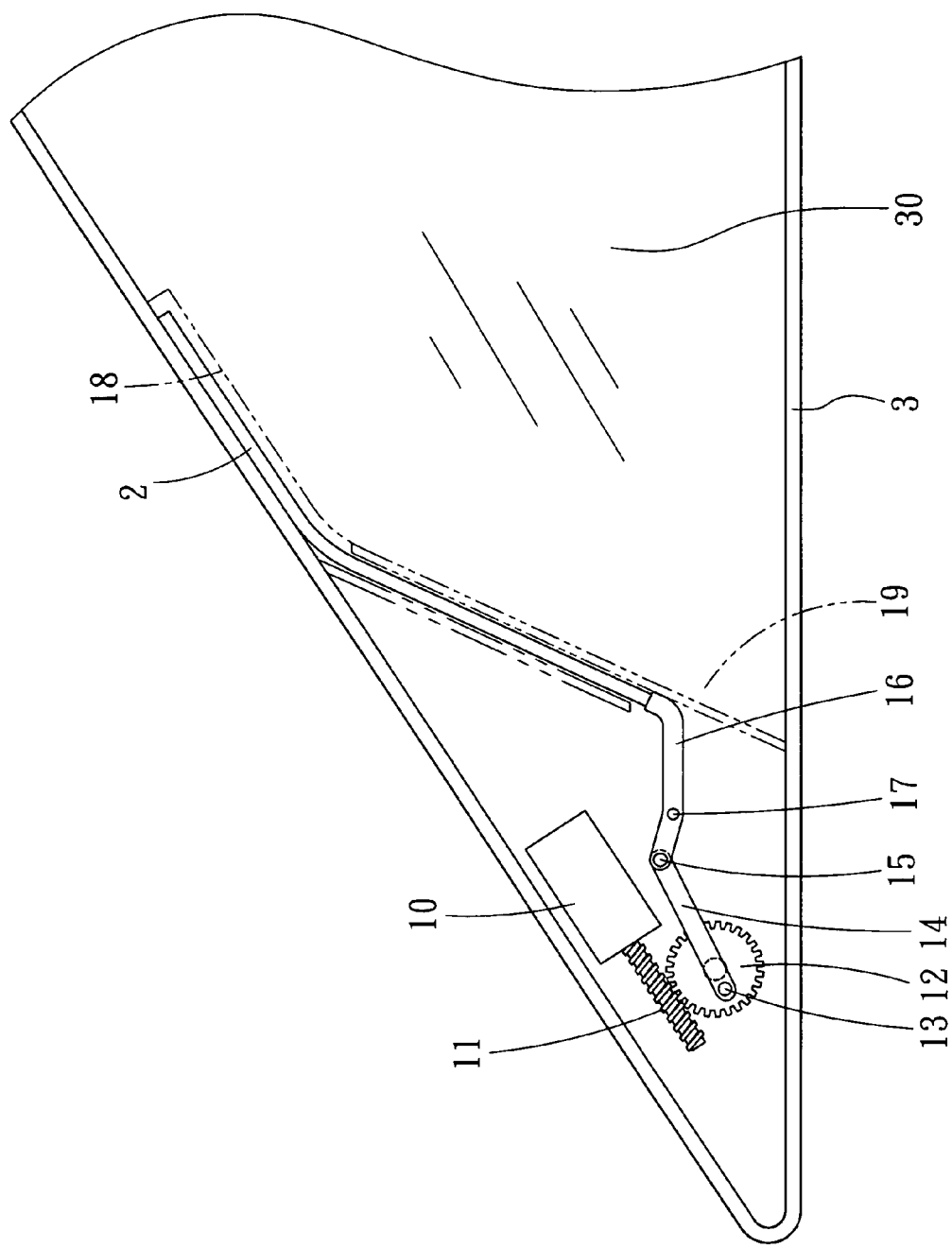
FIG. 2 is a front view of the automobile side window wiper in the present invention.
Figure 3:
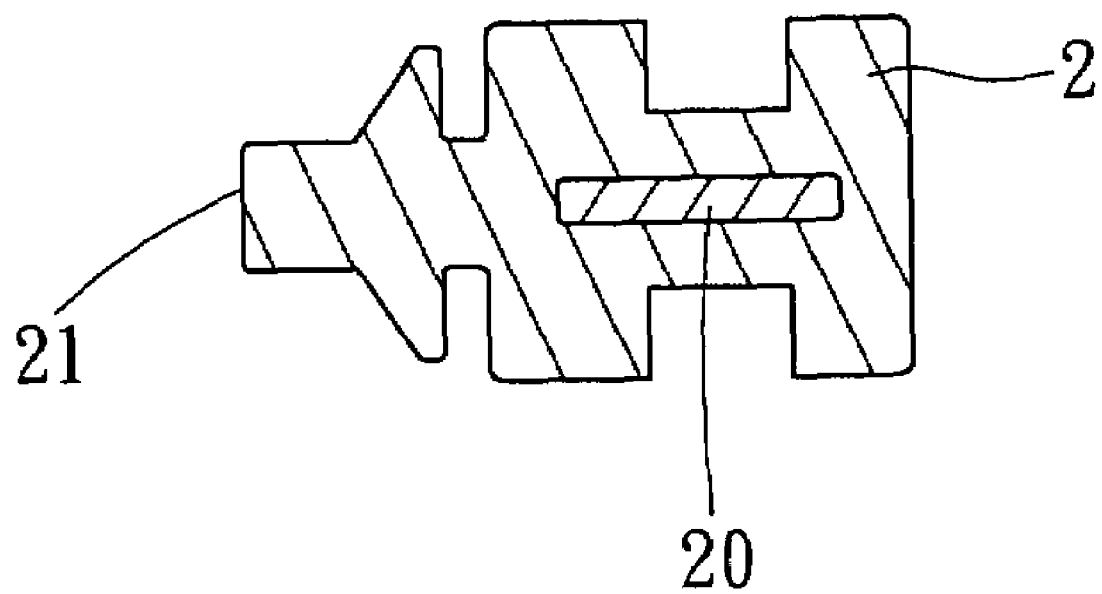
FIG. 3 is a cross-sectional view of the automobile side window wiper in the present invention.

A preferred embodiment of an automobile side window wiper in the present invention, as shown in FIGS. 1, 2 and 3, includes a connect base 1, a motor 10, a worm 11, a worm gear 12, a connect rod 14, a driving arm 16, a wiper 2, a plate stopper 18, and a side cover 19 as main components combined together.

The connect base 1 is preferably shaped triangular to conform a front triangular portion of a side window, having a triangular side wall and an upper wall and a bottom wall, fixed on the front portion of the side window 3.

The motor 10 is fixed between the upper wall and the bottom wall of the connect base 1, and the worm 1 is fixed with the spindle of the motor 10 to rotate together, and the worm gear 12 is positioned on the upper wall of the connect base 1, engaging with the worm 1. The connect rod 14 has its first end connected eccentrically with a side surface of the worm gear 12, and its second end pivotally connected with a first end of the driving arm 16 by a second pivot 15, with a stationary shaft 17 fixed between the upper wall and the bottom wall of the connect base 1 and further pivotally connected with a spot of an intermediate portion of the driving arm 16. Then the second end of the driving arm 16 is connected tightly with a first end of the wiper 2.

The wiper 2 is elongate, made of a soft material, with an elastic elongate member 20 contained in its interior as shown in FIG. 3 for sustaining the wiper elastically so that the wiper 2 may bend flexibly.

The plate stopper 18 is fixed to extend from an inclined side of the connect base 1 to an upper side of a side window 3 for stopping the wiper 2 when the wiper 2 is moved up, and the side cover 19 is closed on a vertical side of the connect base 1, hiding the wiper 2 in the connect base 1 when the wiper 2 is not used.

Then the whole connect base 1 with all of the other components together is fixed on the front portion of a side window 3, with the wiping surface 21 of the wiper 2 contacting closely the glass 30 of the side window 3, as shown in FIG. 2.

Figure 4:
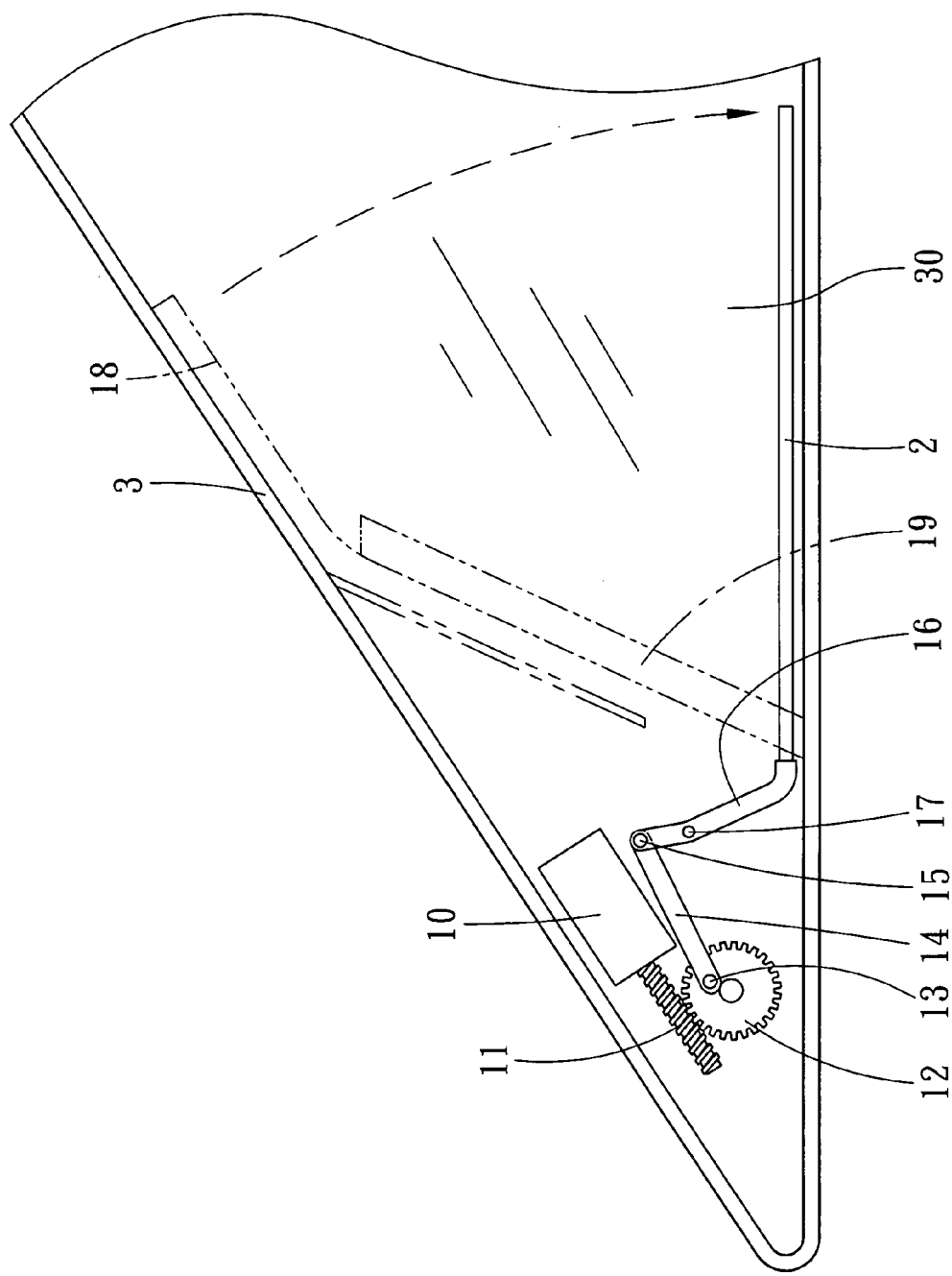
FIG. 4 is a front view of the automobile side window wiper moved down in the present invention; and, FIG. 5 is a front view of the automobile side window wiper reciprocating up and down in the present invention.
Figure 5:
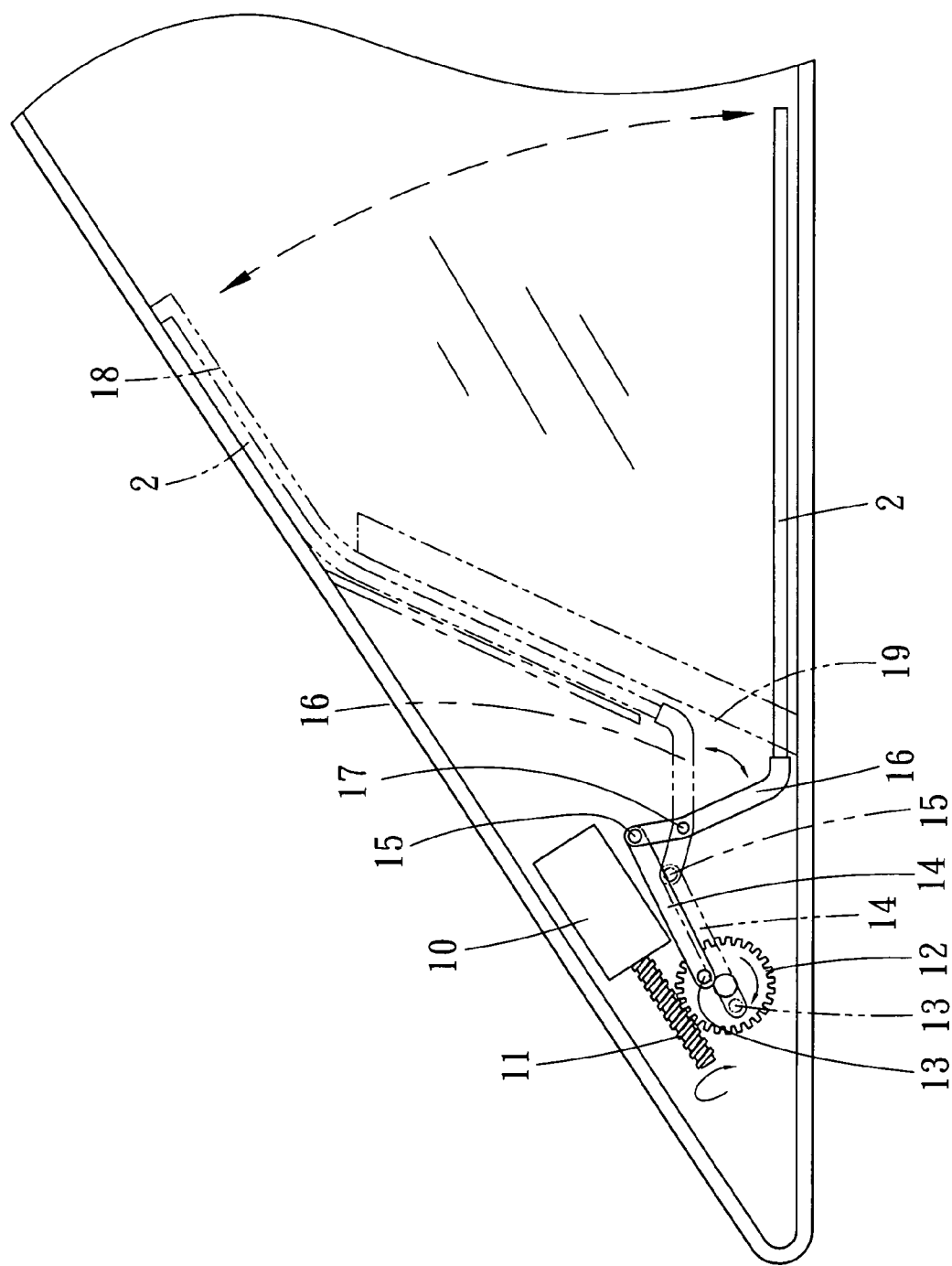

In using, as shown in FIGS. 4 and 5, when the motor 10 is electrified, the worm 11, the worm gear 12 are rotated, moving the connect rod 14 and the diving arm to reciprocated back and forth, with the wiper 2 swinging nearly horizontally, and with the side cover 19 pushed open by the wiper 2 so that the wiper may move out of the connect base and wipe the glass 31 of the side window 3. As the motor 10 operates, the worm 11 is rotated to drive the worm gear 12 so that the first end of connected rod 14 may be moved around the center shaft of the worm gear 12, with the first end of the driving arm 16 is pulled up and down repeatedly by the connect rod 14, and with its second end moved in a curve up and down so that the wiper 2 may be moved up and down repeatedly and almost horizontally on the glass 31 of the side window 3. When the wiper 2 moves to the upper side of the glass 31, it will be stopped by the plate stop 18 and bent a little by means of the resilience of the elastic member 20, as shown in FIG. 2. When the wiper 2 is further moved to leave the plate stop 18 or the upper side of the glass 31 of the side window 3, it will recover its straight condition, and moves down to the lower side of the side window 3. After the wiper 2 contacts the lower side of the side window 3, it will be move up again by the function of the driving arm 16 to the upper side of the side window 3. Thus up and down reciprocating movement of the wiper 2 can wipe off cleanly rain drops remained in the glass 31 of the side window 3 during rainfall. Then the driver of an automobile can see through the side window clearly during raining to look at a rearview mirror for driving safely.

While the preferred embodiment of the invention has been described above, it will be recognized and understood that various modifications may be made therein and the appended claims are intended to cover all such medications that may fall within the spirit and scope of the invention.

What is claimed is:

1. An automobile side window wiper comprising:
   a connect base fixed on a front portion of a side window of an automobile, having three side walls, an upper wall and a bottom wall;

a motor fixed between said upper wall and said bottom wall of said connect base;

a worm fixed with and rotated by a spindle of said motor;

a worm gear fixed on said upper wall of said connect base, engaging with said worm;

a connect rod having a first end eccentrically connected on a side surface of said worm gear and a second end pivotally connected with a first end of a driving arm;

said driving arm having a second end fixed with a first end of a wiper and a spot in an intermediate portion pivotally connected with an immovable shaft fixed between said upper wall and said bottom wall of said connect base; and, said wiper having a certain length nearly to the width of a side window; and wherein a plate stop is provided to extend from an inclined side of said connect base to an upper end of a side window for stopping said wiper, and a side cover is provided by one of said side at a vertical side of said connect base, hiding said wiper in said connect base and the side cover is pivotally connected to a vertical side of the connect base and thus the cover can be opened by movement of the wiper.

* * * * *